United States Patent [19]

Minton

[11] Patent Number: 4,482,832
[45] Date of Patent: Nov. 13, 1984

[54] SHADED POLE MOTOR LAMINATION

[75] Inventor: Paul Minton, Litchfield, Minn.

[73] Assignee: Rival Manufacturing Company, Kansas City, Mo.

[21] Appl. No.: 480,846

[22] Filed: Mar. 31, 1983

[51] Int. Cl.³ ............................................. H02K 17/00
[52] U.S. Cl. .................................. 310/216; 310/166; 310/172
[58] Field of Search ............... 310/166, 172, 163, 211, 310/216–218, 49

[56] References Cited

U.S. PATENT DOCUMENTS

| | | |
|---|---|---|
| 1,822,679 | 3/1931 | Stewart et al. |
| 1,949,968 | 6/1932 | Lilja |
| 1,952,220 | 8/1931 | Price |
| 1,992,956 | 10/1932 | Lilja |
| 1,992,971 | 12/1931 | Stewart |
| 1,993,449 | 6/1932 | Larsh |
| 2,185,990 | 10/1937 | Schurch |
| 2,454,589 | 8/1945 | Ballentine |
| 2,481,113 | 2/1947 | Hardie |
| 2,490,905 | 10/1947 | Hardie |
| 2,492,207 | 12/1949 | Ballentine |
| 2,601,517 | 11/1949 | Hammes |
| 2,781,466 | 5/1954 | Wagner |
| 2,807,735 | 5/1956 | Naul |
| 3,024,377 | 3/1962 | Tupper ............................ 310/172 |
| 3,564,314 | 2/1971 | Haydon |
| 4,013,910 | 3/1977 | Deming .......................... 310/211 |
| 4,048,548 | 9/1977 | Nakajima et al. ............... 310/49 X |
| 4,071,787 | 1/1978 | Lautner et al. |
| 4,131,814 | 12/1971 | Donahoo ........................ 310/172 |
| 4,134,035 | 1/1979 | Donahoo ....................... 310/172 X |

Primary Examiner—Donovan F. Duggan
Attorney, Agent, or Firm—Willian, Brinks, Olds, Hofer, Gilson & Lione, Ltd.

[57] ABSTRACT

A shaded pole lamination is disclosed which includes a rotor opening positioned asymmetrically with respect to the sides of the lamination so as to increase the metal available to carry the magnetic flux on the side of the main pole which is farther from the main coil. In addition, shading coil recesses are provided which are grouped with respective reluctance gaps and crowded into the region near the reluctance gaps in order to maximize the area of the main poles. The shape of the lamination adjacent the reluctance gap has been modified to further increase operating efficiency.

20 Claims, 4 Drawing Figures

SHADED POLE MOTOR LAMINATION

BACKGROUND OF THE INVENTION

The present invention relates to an improved shaded pole motor lamination which exhibits particularly high operating efficiency.

Shaded pole motors are used in a wide variety of applications, including for example counter-top appliances such as can openers, bag openers and the like. Whatever the application, the efficiency with which a motor converts electrical power into mechanical power is important. For any given power and torque requirements, the more efficient the motor, the less expensive it is to manufacture, the less current it draws, and the less heat it generates. Conversely, for a given size motor powered by a given current, the more efficient the motor, the more power and torque it generates. Motor costs can be a critical factor in many highly competitive applications, and increases in motor efficiency translate directly into decreases in motor cost.

SUMMARY OF THE INVENTION

The present invention is directed to a particularly efficient lamination geometry for use in shaded pole motors to increase operating efficiency. The preferred embodiment described below can readily be stamped from sheet metal, can be fabricated using the same techniques as those used to fabricate prior art laminations, and provides important advantages in terms of reduced motor size and cost for a motor of a given power output.

Shaded pole motor laminations of the prior art define rotor openings and shading coil recesses. It has been discovered that marked and surprising increases in motor efficiency can be obtained by changing the geometry of one prior art shaded pole lamination in the following manner. The first change is to offset the rotor opening in the lamination in a direction to reduce localized saturation of the lamination by increasing the volume of steel able to carry magnetic flux in regions of high flux density. The second change found to be important is to crowd the shading coils positioned generally between the main coil of the motor and the rotor in towards a reluctance gap positioned between the main coil and the motor. The third change is to optimize the geometry of the reluctance gap so as further to improve operating efficiency. The details of the particular geometries for each of these three changes will be defined in detail below. Although these three features are best used in combination, each when used alone provides advantages in terms of increased motor operating efficiency.

In laboratory evaluations, a prior art shaded pole motor lamination of the type described below in connection with FIG. 3 was compared with laminations of the shape shown in FIG. 4 which incorporate each of the three modifications listed above. The original prior art lamination provided a overall efficiency (defined as output power divided by input power) in the range of 7–12%. When the modified laminations of FIG. 4 were assembled in a motor (which operated with the same type of main coil and rotor and at the same operating voltage) the overall motor efficiency increased to within the range of 15–24%. Because of this increased efficiency, motors of a predetermined power output which previously required 30 laminations of the prior art FIG. 3 geometry can be made with only 25 laminations of the geometry shown in FIG. 4 below. This reduction in the number of required laminations results in a significant reduction in the fabrication cost of motors made with the laminations shown in FIG. 4.

The invention itself, together with further objects and attendant advantages, will best be understood by reference by the following detailed description taken in conjunction with the accompanying drawings.

DETAILED DESCRIPTION OF THE PRESENTLY PREFERRED EMBODIMENTS

Figure 1:
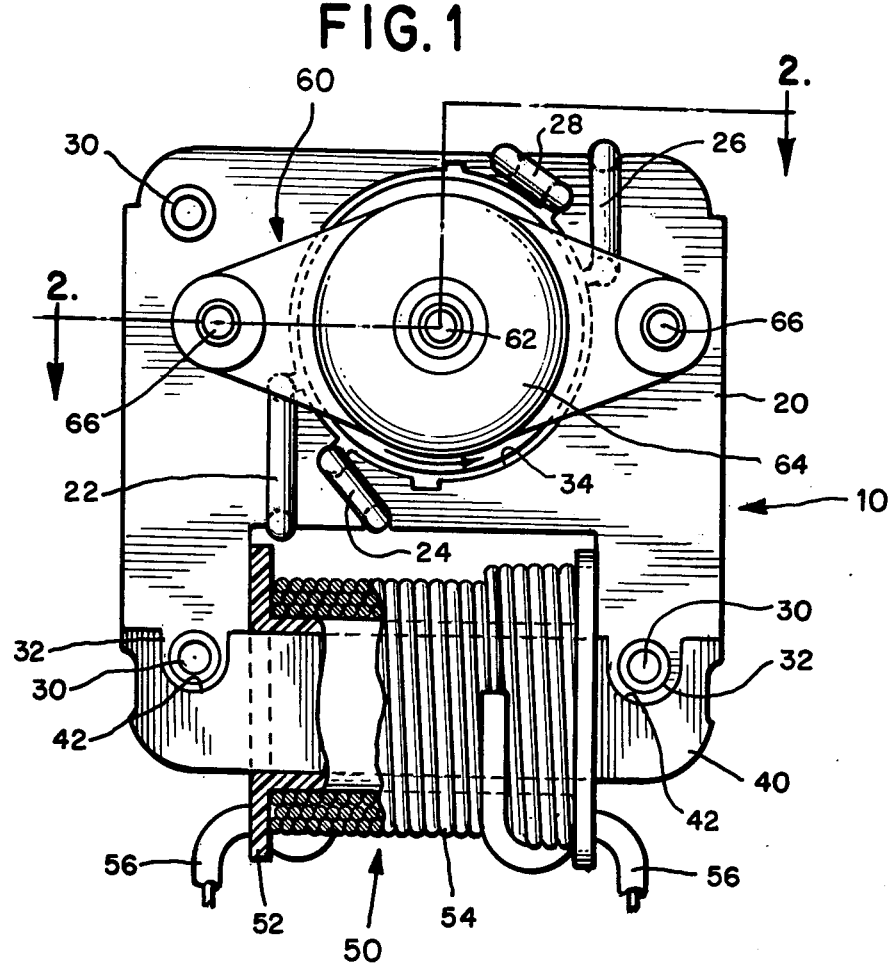
FIG. 1 is a plan view of a shaded pole motor of a general type which can built with laminations of this invention.
Figure 2:
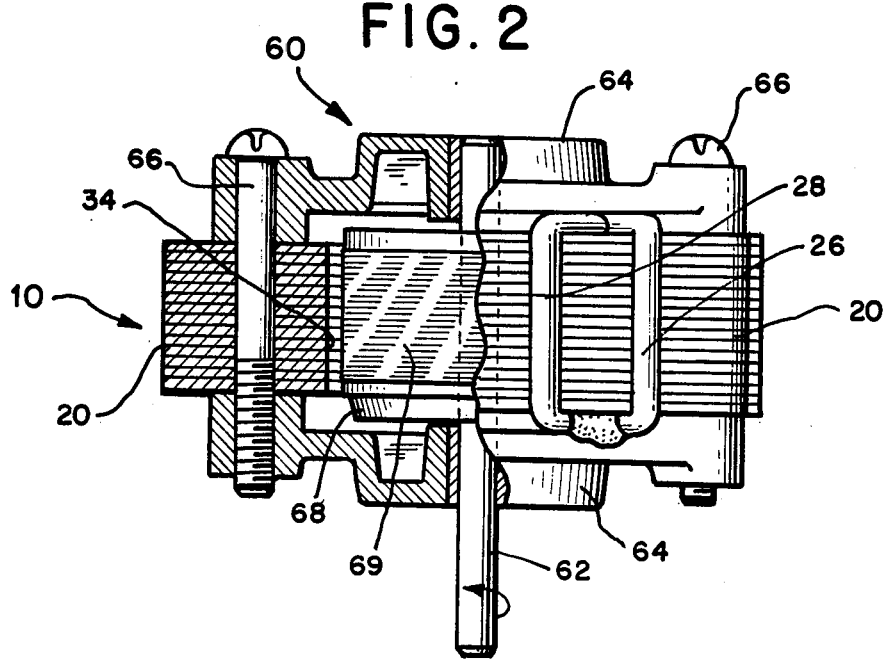
FIG. 2 is a partial sectional view taken along line 2—2 of FIG. 1.

Turning to the drawings, FIGS. 1 and 2 show two views of a shaded pole motor of a type which can be constructed using the laminations of the present invention. As shown in FIG. 1, this motor 10 includes an A-frame assembly 20 which is made up of a stack of thin, carbon steel laminations which are held together in intimate contact by means of rivets 30. The size and power of the motor 10 are determined in part by the number of laminations included in the A-frame assembly 20. This A-frame assembly 20 also includes large and small shading coils 22, 24, 26, 28 on each motor pole. Each of the shading coils 22, 24, 26, 28 is formed of a loop of copper or other good electrical conductor which is arranged to encircle a portion of the motor pole near a rotor opening 34. The purpose of the shading coils is to alter the magnetic field produced by the main coil in order to produce torque and rotation of the motor rotor. After the shading coils 22, 24, 26, 28 have been assembled on the A-frame assembly 20, the ends of the coils are formed and welded to each other to form a continuous loop of conductive material at each of the shading coils 22, 24, 26, 28.

The motor 10 also includes an I-bar assembly 40 which is also made up of a stack of thin, carbon steel laminations held in intimate contact with rivets (not shown). Normally, the nominal stack size of laminations in the I-bar assembly 40 is the same as that of the A-frame assembly 20. The A-frame assembly 20 defines two spaced tabs 32 which are arranged to align with two spaced recesses 42 defined by the I-bar assembly 40. The I-bar asembly 40 is secured to the A-frame assembly 20 by pressing the tabs 32 into the recesses 42 after the coil has been asembled over the I-bar assembly 40. This results in a rigid stator assembly with the coil in position to produce a magnetic field in the motor when it is energized.

As previously mentioned, a coil asembly 50 is mounted on the I-bar assembly 40 prior to assembly with the A-frame assembly 20. This coil assembly 50 is made up of a thermo-plastic bobbin 52 which is wound with a specific number of turns of wire 54 to form a main coil. The size of the wire 54 and the number of turns on the bobbin 52 are calculated to provide the desired performance characteristics to the motor 10.

Typically, the wire 54 is insulated with any of a number of suitable materials such as enamel, polyurethane, or nylon. The wire 54 can be made of any suitable conductor, such as copper or aluminum. The ends of the wire 54 are connected to insulated lead wires 56 which are adapted for connection to a power source (not shown).

A rotor assembly 60 is also included in the motor 10. Typically, this rotor assembly 60 includes a rotor 68 which is made up of a series of stacked carbon steel laminations. These laminations are provided with a series of equally spaced slots and are stacked in such a manner as to align the laminations with adjacent slots skewed with respect to one another to form skewed rotor bars 69. The skew angle is usually chosen to provide a skew of one to one and a half bars between the top and bottom laminations of the rotor 68. The purpose of this skew angle is to provide an even torque to the rotor as each rotor bar passes the motor poles defined by the A-frame assembly 20. After the rotor laminations have been stacked, the rotor 68 is die cast with aluminum which fills all of the slots and forms an end ring on each end of the stack, thereby connecting the bars together. After casting, the outside diameter of the rotor 68 is ground, the inside diameter is reamed, and a ground shaft 62 is pressed into the inside diameter. The rotor 68 is then assembled onto the A-frame assembly 20, typically by means of two brackets 64 which position sintered metal bearings around the shaft 62. Once the shaft 62 is in place within these bearings, the bearing brackets 64 are fastened to the A-frame assembly 20 by means of screws 66. Typically, thin steel thrust washers (not shown) are used on the shaft 62 in order to align the rotor 68 axially with the A-frame assembly 20.

The fully assembled motor 10 is used by connecting an alternating voltage source between the lead wires 56 and coupling the shaft 62 to a driven part.

Figure 3:
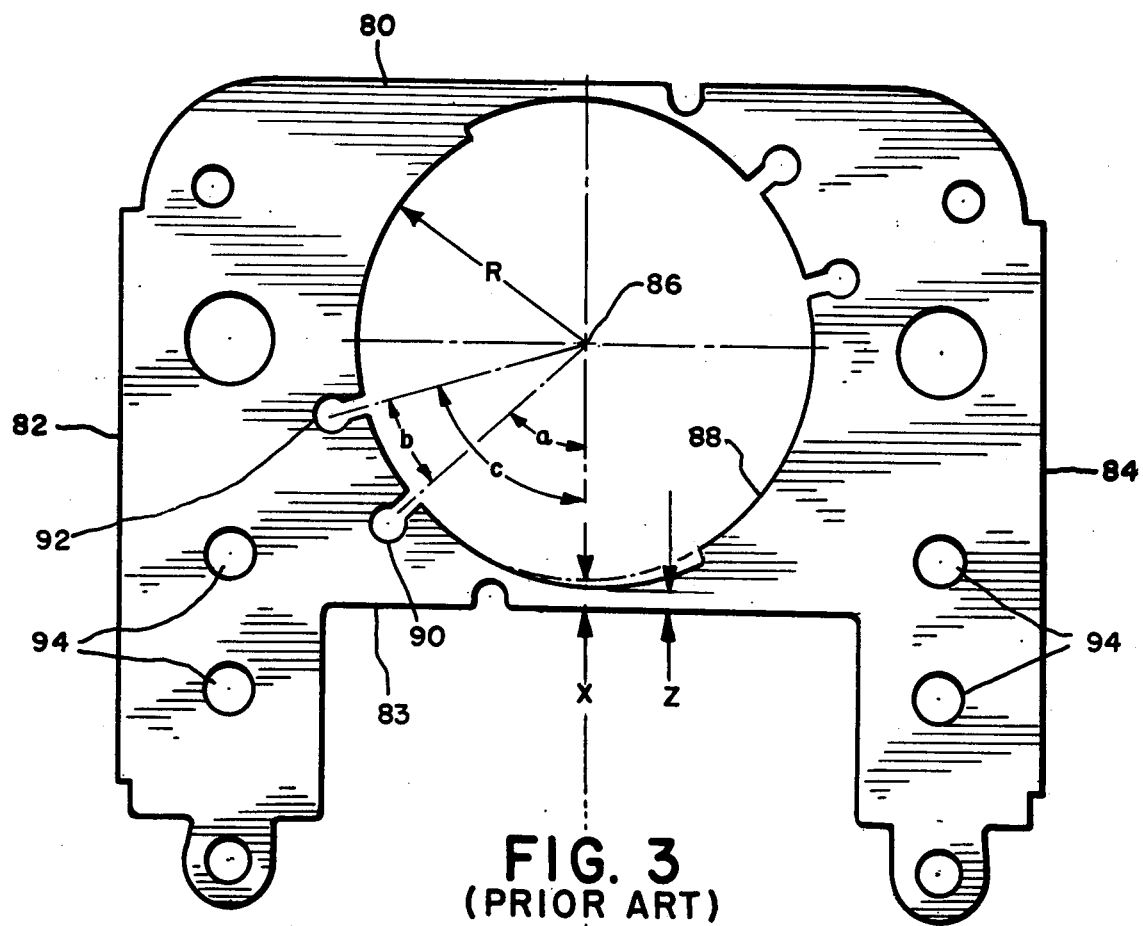
FIG. 3 is a plan view of a prior art shaded pole lamination which has been illustrated for purposes of comparison with the present invention.

FIG. 3 shows a prior art lamination suitable for use in the A-frame assembly 20. This lamination 80 is stamped from commercial grade annealed steel, 24 gauge (0.025 inches) in thickness. As shown in FIG. 3, this lamination 80 defines two side edges 82, 84 which are symmetrically disposed with respect to a center 86. The center 86 is the center of a rotor opening 88 having a radius of 0.625 inches. The lamination 80 defines a plurality of shading coil recesses 90 and 92 as well as a number of miscellaneous holes 94.

FIG. 3 shows various angles with respect to the axis of symmetry extending through the center 86 parallel to the side edges 82, 84. In this particular prior art lamination 80, the distance between the side edges 82, 84 is 2.500 inches, the angular dispositions of the shading coil recesses 90, 92 are as indicated in FIG. 3, the minimum width Z of the lamination adjacent the main coil is 0.053 inches, and the separation X between the extension of the circular circumference of the rotor opening 82 and the edge of the lamination 83 adjacent the main coil is 0.062 inches.

Figure 4:
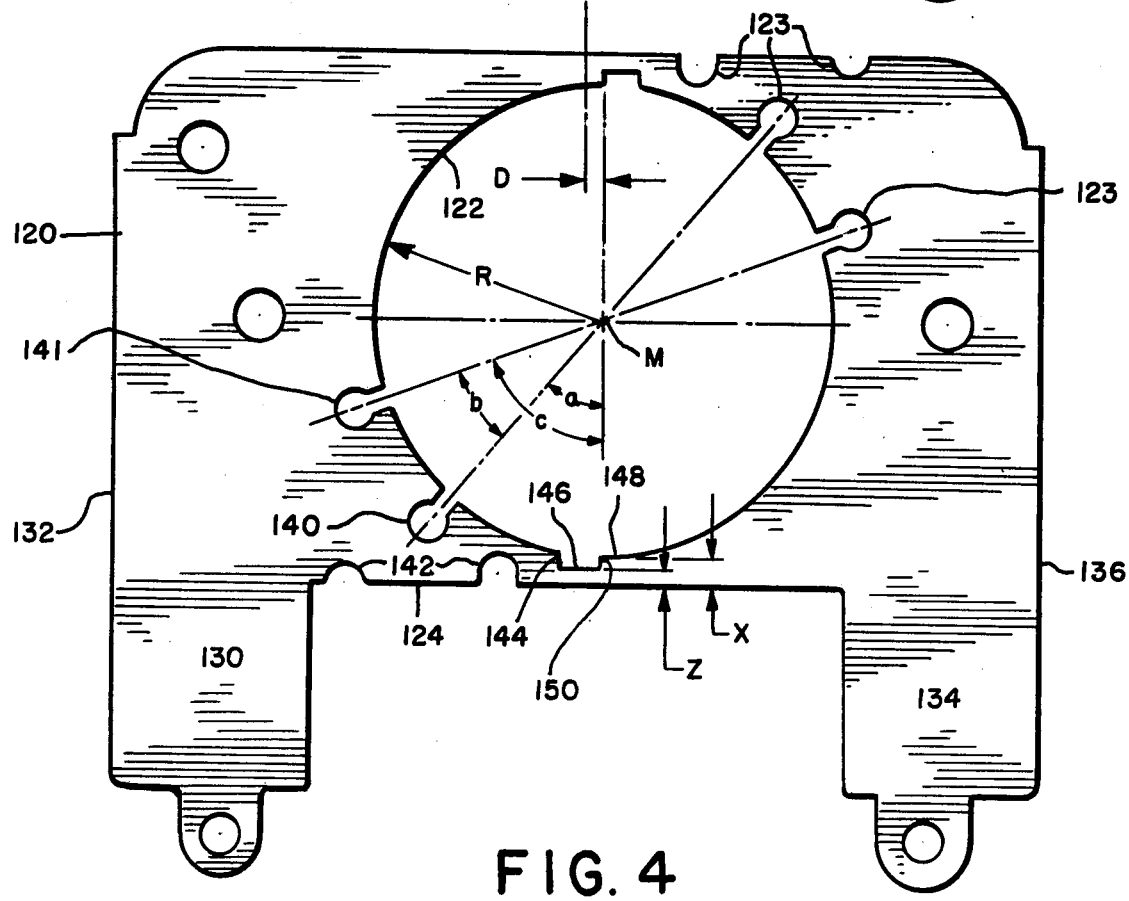
FIG. 4 is a plan view of a shaded pole lamination built in accordance with this invention.

Turning now to FIG. 4, the presently preferred embodiment of the shaded coil lamination of this invention is there shown. This embodiment includes a plate 120. For purposes of example only, this plate can be formed of commercial grade annealed steel, 24 gauge (0.025 inches) in thickness. This plate 120 defines a rotor opening 122 which is circular in shape about a center M. In this preferred embodiment the radius R of the rotor opening 122 is 0.625 inches.

The plate 120 also defines a first plate edge 124 which is situated adjacent the main coil in use. Laterally, the plate 120 defines a first leg 130 which is bounded at its outside edge by a second plate edge 132. In addition, the plate 120 defines a second leg 134 which is bounded at its outside edge by a third plate edge 136. In this embodiment, the second and third plate edges 132, 136 define the sides of the plate 120, are separated by 2.500 inches, and are orientated transversely with respect to the first plate edge 124.

First and second shading coil recesses 140, 141 are defined by the plate 120 in communication with the rotor opening 122. In addition, two shading coil recess 142 are defined by the plate 120 in communication with the first plate edge 124. Additional shading coil recesses 123 are defined by the plate 120 on the side of the plate 120 opposed to the first plate edge 124.

The shading coil recesses 140, 141, 142 are grouped with a reluctance gap 144. This reluctance gap 144 is generally rectangular on three sides, and includes a base 146 orientated parallel to and spaced from the first plate edge 124. One edge 150 of the reluctance gap 144 defines an index point.

As shown in FIG. 4, the center M of the rotor opening 122 is offset with respect to the second and third edges 132, 136 by an amount D. This offset dimension is also identified by the symbol D in Table 1, and is equal to 0.062 inches in this preferred embodiment. In FIG. 4, the angle a with respect to the center M between the first shading coil recess 140 and the index point 150 is equal to 41.5 degrees. The angle b with respect to the center M between the first and second shading coil recesses 140, 141 is equal to 28.5 degrees. The angle c with respect to the center M between the second shading coil recess 141 and the index point 150 is equal to 70 degrees.

With respect to the geometry of the reluctance gap 144, the width of the plate 120 between the base 146 of the reluctance gap 144 and the first plate edge 124 is identified by the symbol Z in FIG. 4, and in this embodiment is equal to 0.052 inches. The width of the plate 120 between the rotor opening 148 adjacent the gap and the first plate edge 124 is identified by the symbol X in FIG. 4, and in this preferred embodiment is equal to 0.077 inches. Note also that the shading coil recesses have been shaped to recess the shading coils at the outside edges of the plate 120, and that all miscellaneous holes have been eliminated.

Table 1 summarizes a number of important geometrical differences between the prior art lamination of FIG. 3 and the preferred embodiment of this invention shown in FIG. 4. In this table, the symbols a, b, c, X, Z, R, and D are as defined above in conjunction with FIGS. 3 and 4.

TABLE 1

| Parameter | FIG. 3 | FIG. 4 |
|---|---|---|
| a | 48° | 41.5° |
| b | 27° | 28.5° |
| c | 75° | 70° |
| a/b | 1.78 | 1.46 |
| c/a | 1.56 | 1.69 |
| X | 0.062 | 0.077 |
| Z | 0.053 | 0.052 |
| R | 0.625 | 0.625 |
| R/X | 10.08 | 8.12 |
| Z(X-Z) | 5.89 | 2.08 |
| D | 0 | 0.062 |
| R | 0.625 | 0.625 |
| D/R | 0 | 0.099 |

The operating efficiency of motors constructed from laminations of the types shown in FIGS. 3 and 4 have been compared in laboratory tests. For these tests, two motors were constructed, the first using the lamination of FIG. 3 and the second using lamination of FIG. 4. Both motors used identical, nineteen bar rotors in which the bars were equally spaced. The same input voltage, rotor, and main coil were used, and the stack thickness for both the A-frame assemblies and the I-bar assemblies were identical for both motors. These tests indicated that, depending on operating conditions, the motor made with the laminations of FIG. 3 provided an overall efficiency in the range of 7–12%. The motor made with the laminations of FIG. 4 provided a markedly increased overall efficiency in the range of 15–24%. Stated in other terms, a motor made with the laminations of FIG. 4 required only 25 plates 120 and yet produced the same power as a motor made with 30 laminations of the type shown in FIG. 3. This comparison between motors made with the laminations of FIGS. 3 and 4 illustrates the significant savings that can be achieved with the lamination of FIG. 4.

The lamination of FIG. 4 differs from that of FIG. 3 in a number of features which are intended to reduce the effects of magnetic saturation in localized regions of the lamination by increasing the volume steel able to carry the flux. Conversely, in areas of lesser magnetic flux where localized saturation does not occur, the volume of steel in the lamination has been reduced. The object in designing the lamination of FIG. 4 was to produce a lamination designed with approximately equal magnetic flux density in all areas and to reduce the effects of localized saturation.

The first of the modifications to the lamination of FIG. 3 made to accomplish this objective was to position the rotor opening 122 asymmetrically on the plate 120. This asymmetry was selected to equalize the magnetic flux density in the region adjacent the first leg 130 with the flux density in the region adjacent the second leg 134. Thus, the spacing between the motor opening 122 and the second plate edge 132 is greater than the separation between the rotor opening 122 and the third plate edge 136. This offset is in the direction to increase the volume of steel available to carry the main flux from the pole farther from the main coil and to reduce the steel positioned to carry the smaller portion of flux that goes to the shaded portion of the pole on the opposite side of the lamination.

A second modification was to adjust the portion of the pole covered or shaded by the shading coils in order to shade a smaller amount of the main poles. In this way, the main pole faces were increased to surround the rotor with more steel and to thicken the magnetic bridge between opposite main poles. Because of this increased magnetic bridge between opposite main poles, the shaded portion of the poles could be reduced without increasing the flux density there. This modification is reflected in the specific angles a, b and c, shown in FIG. 4. As shown in Table 1, the ratios of these angles of FIG. 4 differ significantly from the corresponding angles of FIG. 3. By comparing FIGS. 3 and 4, it is apparent that the shading coils in the lamination of FIG. 4 have been crowded into the region near the reluctance gap. In this way, large torques are maintained for starting (since the shading coils still cover a comparable angle of circumference) with increased overall efficiency. This is in part due to the fact that the area near the reluctance gap is a relatively small contributor to the main pole in any case.

A third important modification was to adjust the geometry of the plate 120 near the reluctance gap 144. To some extent, this reluctance gap 144 acts as a third shaded pole since the restriction in the plate 120 formed by the reluctance gap 144 acts to delay the flux. The combination of a relatively large dimension X in cooperation with a relatively small angle a provides the combined advantages of good operating efficiency and excellent starting torque.

Other modifications made to improve efficiency include the elimination of unused mounting holes and the embedding of the shading coils in the steel of the lamination to maximize their magnetic effect by reducing the path through air and increasing the path through steel of the opposing flux generated by the shading coils.

The embodiment of FIG. 4 as compared with the prior art lamination of FIG. 3 provides increased peak running torque for a given operating current. Furthermore, for a motor of a given operating torque, it provides a shorter stack which requires reduced current for the same peak running torque. In addition, operating temperatures are reduced, as is the size of the motor.

As described above, the present invention is directed to an improved lamination for shaded pole motors. It should be understood that the laminations of this invention can be used in conjunction with a wide variety of shaded pole motor constructions. For example, individual laminations can either be riveted or welded together. The details of the main coil, the bobbin, the I-bar construction, the rotor, and the rotor bearing brackets can all be modified as desired to suit individual applications. Furthermore, the fabrication method used to form the shading coils can be varied, as can materials and dimensions.

In addition, a range of modifications and changes to the preferred embodiment described above will be apparent to those skilled in the art. For example, selected ones of the modifications described above can be used alone, rather than in combination. It is therefore intended that the foregoing detailed description be regarded as illustrative rather than limiting, and that it be understood that it is the following claims, including all equivalents, which are intended to define the scope of this invention.

I claim:

1. A lamination for a shaded pole motor comprising a rotor, a main coil, and a plurality of shading coils, said lamination comprising:

a plate;

means, included in the plate, for defining a rotor opening having a selected radius R with respect to a center;

means, included in the plate, for defining a first plate edge which in use is adjacent the main coil between the main coil and the rotor opening;

means, included in the plate, for defining first and second spaced legs which in use are adjacent respective ends of the main coil, said first and second legs bounded at the outside by second and third plate edges, respectively;

means, included in the plate, for defining a plurality of shading coil recesses, a first one of which is positioned in communication with the rotor opening and a second one of which is positioned in communication with the first plate edge, both the first and second recesses and the second plate edge being positioned on a first side of a line which extends between the center and the first plate edge; said rotor opening being offset laterally in the plate such that the separation between the rotor opening and the second plate edge is greater than the separation between the rotor opening and the third plate edge by an amount 2D such that the ratio D/R is in the range of about 0.05 to about 0.15.

2. The invention of claim 1 wherein the ratio D/R is substantially equal to 0.1.

3. The invention of claim 1 further comprising:
means, included in the plate, for defining a reluctance gap in communication with the rotor opening between the rotor opening and the first plate edge; said reluctance gap dimensioned such that the width of the plate between the first plate edge and the rotor opening adjacent the reluctance gap is equal to X, the width of the plate between the reluctance gap and the plate edge is equal to Z, and the ratio Z/(X−Z) is in the range of about 1.8 to about 2.4.

4. The invention of claim 3 wherein the ratio R/X is in the range of about 7.0 to about 9.0.

5. The invention of claim 3 wherein the first shading coil recess is grouped with the reluctance gap; wherein the plate further comprises means for defining a third shading coil recess in communication with the rotor opening and grouped with the reluctance gap; and wherein the first and third shading coil recesses are positioned with respect to the reluctance gap such that the angle with respect to the center between the first recess and the gap is equal to a, the angle with respect to the center between the first and third recesses is equal to b, and the ratio a/b is in the range of about 1.35 to about 1.55.

6. The invention of claim 5 wherein the angle with respect to the center between the third recess and the gap is equal to c, and the ratio c/a is in the range of about 1.60 to about 1.80.

7. A lamination for a shaded pole motor comprising a rotor, a main coil, and a plurality of shading coils, said lamination comprising:
a plate;
means, included in the plate, for defining a rotor opening having a selected radius R with respect to a center M;
means, included in the plate, for defining a first plate edge which, in use, is adjacent the main coil between the main coil and the rotor opening;
means, included in the plate, for defining a reluctance gap in communication with the rotor opening between the rotor opening and the first plate edge;
said rotor opening positioned such that the width of the plate between the first plate edge and the rotor opening adjacent the reluctance gap is equal to X, and X is chosen such that the ratio R/X is in the range of about 7.0 to about 9.0.

8. The invention of claim 7 wherein the ratio R/X is substantially equal to 8.

9. The invention of claim 7 wherein the gap is positioned on a first side of a first line which extends perpendicularly from the first plate edge through the center M; wherein the plate defines a first side, transverse to the first plate edge on the same side of the first line as the gap; wherein the plate defines a second side, transverse to the first plate edge on the other side of the first line from the gap; wherein the separation between the first side and the center M minus the separation between the second side and the center M is equal to 2D; and wherein the ratio D/R is in the range of about 0.05 to about 0.15.

10. A lamination for a shaded pole motor comprising a rotor, a main coil, and a plurality of shading coils, said lamination comprising:
a plate;
means, included in the plate, for defining a rotor opening having a selected radius R with respect to a center M;
means, included in the plate, for defining a first plate edge which, in use, is adjacent the main coil between the main coil and the rotor opening;
means, included in the plate, for defining a reluctance gap in communication with the rotor opening between the rotor opening and the plate edge;
said reluctance gap dimensioned such that the width of the plate between the first plate edge and the rotor opening adjacent the reluctance gap is equal to X, the width of the plate between the reluctance gap and the first plate edge is equal to Z, and the ratio Z/(X−Z) is in the range of about 1.8 to about 2.4.

11. The invention of claim 10 wherein the ratio Z/(X−Z) is substantially equal to 2.1.

12. The invention of claim 10 wherein the gap is positioned on a first side of a first line which extends perpendicularly from the first plate edge through the center M; wherein the plate defines a first side, transverse to the first plate edge on the same side of the first line as the gap; wherein the plate defines a second side, transverse to the first plate edge on the other side of the first line from the gap; wherein the separation between the first side and the center M minus the separation between the second side and the center M is equal to 2D; and wherein the ratio D/R is in the range of about 0.05 to about 0.15.

13. A lamination for a shaded pole motor comprising a rotor, a main coil, and a plurality of shading coils, said lamination comprising:
a plate;
means, included in the plate, for defining a rotor opening having a selected radius R with respect to a center M;
means, included in the plate, for defining a reluctance gap in communication with the rotor opening, said reluctance gap defining an index point;
means, included in the plate, for defining first and second shading coil recesses grouped with the reluctance gap and in communication with the rotor opening;
said first and second shading coil recesses positioned with respect to the reluctance gap such that the angle with respect to the center M between the first recess and the index point is equal to a, the angle with respect to the center M between the first recess and the second recess is equal to b, and the ratio a/b is in the range of about 1.35 to about 1.55.

14. The invention of claim 13 wherein the ratio a/b is substantially equal to 1.45.

15. The invention of claim 13 wherein the plate defines a first plate edge which, in use, is adjacent the main coil between the main coil and the rotor opening, wherein the gap is positioned on a first side of a first line which extends perpendicularly from the first plate edge through the center M; wherein the plate defines a first side, transverse to the first plate edge on the same side of the first line as the gap; wherein the plate defines a second side, transverse to the first plate edge on the other side of the first line from the gap; wherein the separation between the first side and the center M minus the separation between the second side and the center M is equal to 2D; and wherein the ratio D/R is in the range of about 0.05 to about 0.15.

16. A lamination for a shaded pole motor comprising a rotor, a main coil, and a plurality of shading coils, said lamination comprising:
   a plate;
   means, included in the plate, for defining a rotor opening having a selected radius R with respect to a center M;
   means, included in the plate, for defining a reluctance gap in communication with the rotor opening, said reluctance gap defining an index point;
   means, included in the plate, for defining first and second shading coil recesses grouped with the reluctance gap and in communication with the rotor opening;
   said first and second shading coil recesses positioned with respect to the reluctance gap such that the angle with respect to the center M between the first recess and the index point is equal to a, the angle with respect to the center M between the second recess and the index point is equal to c, and the ratio c/a is in the range of about 1.60 to about 1.80.

17. The invention of claim 16 wherein the ratio c/a is substantially equal to 1.69.

18. The invention of claim 16 wherein the plate defines a first plate edge which, in use, is adjacent the main coil between the main coil and the rotor opening; wherein the gap is positioned on a first side of a first line which extends perpendicularly from the first plate edge through the center M; wherein the plate defines a first side, transverse to the first plate edge on the same side of the first line as the gap; wherein the plate defines a second side, transverse to the first plate edge on the other side of the first line from the gap; wherein the separation between the first side and the center M minus the separation between the second side and the center M is equal to 2D; and wherein the ratio D/R is in the range of about 0.05 to about 0.15.

19. A lamination for a shaded pole motor comprising a rotor, a main coil, and a plurality of shading coils, said lamination comprising:
   a plate;
   means, included in the plate, for defining a rotor opening having a radius R with respect to a center M;
   means, included in the plate, for defining a first plate edge which in use is adjacent the main coil between the main coil and the rotor opening;
   means, included in the plate, for defining first and second spaced legs which in use are adjacent respective ends of the main coil, said first and second legs bounded transversely to the first plate edge by second and third plate edges, respectively;
   means, included in the plate, for defining a plurality of grouped shading coil recesses, first and second ones of which are positioned in communication with the rotor opening and a third one of which is positioned in communication with the first plate edge, the first, second, and third recesses and the second plate edge being positioned on a first side of a first line which extends between the center M and the first plate edge; and
   means for defining a reluctance gap in communication with the rotor opening and aligned with the first line;
   said rotor opening being offset laterally in the plate along a line parallel to the first plate edge such that the separation between the rotor opening and the second plate edge is greater than the separation between the rotor opening and the third plate edge by an amount 2D such that the ratio D/R is in the range of about 0.05 to about 0.15;
   said rotor opening positioned such that the width of the plate between the first plate edge and the rotor opening adjacent the reluctance gap is equal to X, and X is chosen such that the ratio R/X is in the range of about 7.0 to about 9.0;
   said reluctance gap dimensioned such that the width of the plate between the reluctance gap and the first plate edge is equal to Z, and the ratio Z/(X−Z) is in the range of about 1.7 to about 2.4;
   said first and second shading coil recesses positioned with respect to the reluctance gap such that the angle with respect to the center M between the first recess and the reluctance gap is equal to a, the angle with respect to the center M between the first recess and the second recess is equal to b, and the ratio a/b is in the range of about 1.35 to about 1.55;
   said first and second shading coil recesses positioned with respect to the reluctance gap such that the angle with respect to the center M between the second recess and the reluctance gap is equal to c, and the ratio c/a is in the range of about 1.60 to about 1.80.

20. The invention of claim 19 wherein the ratio D/R is substantially equal to 0.1; wherein the ratio R/X is substantially equal to 8; wherein the ratio Z/(X−Z) is substantially equal to 2.1; wherein the ratio a/b is substantially equal to 1.46; and wherein the ratio c/a is substantially equal to 1.69.

* * * * *